United States Patent
Diab

(10) Patent No.: US 8,356,190 B2
(45) Date of Patent: Jan. 15, 2013

(54) METHOD AND SYSTEM FOR ENERGY EFFICIENT COMMUNICATION AMONG ONE OR MORE INTERFACES IN A COMMUNICATION PATH

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 392 days.

(21) Appl. No.: 12/478,320

(22) Filed: Jun. 4, 2009

(65) Prior Publication Data

US 2010/0115295 A1 May 6, 2010

Related U.S. Application Data

(60) Provisional application No. 61/111,653, filed on Nov. 5, 2008.

(51) Int. Cl.
*G06F 1/00* (2006.01)
*G06F 1/26* (2006.01)
*G06F 1/32* (2006.01)

(52) U.S. Cl. .................... 713/300; 713/320; 713/323
(58) Field of Classification Search .......... 713/300–320, 713/323
See application file for complete search history.

(56) References Cited

U.S. PATENT DOCUMENTS

| | | | |
|---|---|---|---|
| 5,805,597 A | 9/1998 | Edem | |
| 6,687,837 B1 * | 2/2004 | Beck | 713/300 |
| 6,795,450 B1 * | 9/2004 | Mills et al. | 370/463 |
| 6,963,985 B2 * | 11/2005 | Stachura et al. | 713/310 |
| 7,603,574 B1 * | 10/2009 | Gyugyi et al. | 713/300 |
| 7,710,895 B2 * | 5/2010 | Muth | 370/252 |
| 7,710,939 B2 * | 5/2010 | Shao et al. | 370/349 |
| 7,903,597 B2 * | 3/2011 | Biederman et al. | 370/311 |
| 7,930,373 B2 * | 4/2011 | Diab | 709/220 |
| 2002/0159404 A1 * | 10/2002 | Raissinia et al. | 370/318 |
| 2003/0086550 A1 * | 5/2003 | Hershkovits et al. | 379/221.03 |
| 2004/0003296 A1 * | 1/2004 | Robert et al. | 713/300 |

(Continued)

FOREIGN PATENT DOCUMENTS

EP 1248426 A2 * 10/2002

(Continued)

OTHER PUBLICATIONS

Kozierok, Charles M., "Physical Layer (Layer 1)", Sep. 20, 2005, retrieved from the Internet on Jul. 7, 2012 at <http://www.tcpipguide.com/free/t_PhysicalLayerLayer1.htm>, pp. 1-4.*

(Continued)

*Primary Examiner* — Faisal M Zaman
(74) *Attorney, Agent, or Firm* — Duane S. Kobayashi

(57) ABSTRACT

Network devices coupled via serial and/or parallel interfaces may determine a power level mode of operation according to an energy efficient network communication control policy and may configure one or more of the interfaces for the lower power mode. The network devices may comprise a PHY, a MAC and/or higher layer devices. The interfaces may comprise a XGMII extender, a XAUI and/or a XFI device. The interfaces may comprise a backplane PHY, for example, a 10 GBASE-KR, a 10 GBASE-KX4 and/or a 1 GBASE-KX PHY which may perform FEC. The interfaces may comprise direct attach copper such as SFP+ and/or InfiniBand and/or 10 GBASE-CX4 PHYs. The interfaces may comprise a plug-gable transceiver module. Energy efficient network control data may be communicated to and/or from the network devices which may enter and/or exit a lower power mode of operation.

18 Claims, 8 Drawing Sheets

U.S. PATENT DOCUMENTS

| | | | |
|---|---|---|---|
| 2004/0233929 A1* | 11/2004 | Hall et al. ..................... 370/464 |
| 2005/0097378 A1* | 5/2005 | Hwang ......................... 713/320 |
| 2005/0195075 A1* | 9/2005 | McGraw et al. .............. 340/500 |
| 2006/0034295 A1 | 2/2006 | Cherukuri et al. |
| 2006/0092928 A1* | 5/2006 | Pike et al. ..................... 370/355 |
| 2006/0139904 A1* | 6/2006 | Wei et al. ...................... 361/788 |
| 2006/0143255 A1* | 6/2006 | Shinohe et al. ............... 707/205 |
| 2007/0047536 A1* | 3/2007 | Scherer et al. ................ 370/360 |
| 2007/0101173 A1* | 5/2007 | Fung ............................. 713/300 |
| 2007/0162773 A1* | 7/2007 | Krantz et al. ................. 713/300 |
| 2007/0198100 A1* | 8/2007 | Butters et al. ................... 700/19 |
| 2007/0280239 A1 | 12/2007 | Lund |
| 2008/0095541 A1* | 4/2008 | Dallesasse .................... 398/191 |
| 2008/0123662 A1* | 5/2008 | Basso et al. ............. 370/395.31 |
| 2009/0046804 A1* | 2/2009 | Yuan ............................. 375/295 |
| 2009/0077394 A1* | 3/2009 | Tsai et al. ..................... 713/310 |
| 2009/0327782 A1* | 12/2009 | Ballou et al. ................. 713/330 |
| 2010/0180135 A1* | 7/2010 | Lambert ....................... 713/323 |
| 2010/0332866 A1* | 12/2010 | Lee et al. ...................... 713/300 |

FOREIGN PATENT DOCUMENTS

| | | | |
|---|---|---|---|
| EP | 2184891 A1 * | 5/2010 |
| JP | 10070561 A * | 3/1998 |
| JP | 2006191415 A * | 7/2006 |
| JP | 2011212946 A * | 10/2011 |
| JP | 2012100306 A * | 5/2012 |
| WO | WO 2010121965 A1 * | 10/2010 |

OTHER PUBLICATIONS

Nakagawa et al., "A Single-Chip, 10-Gigabit Ethernet Switch LSI for Energy-Efficient Blade Servers," Green Computing and Communications (GreenCom), 2010 IEEE/ACM Int'l Conference on & Int'l Conference on Cyber, Physical and Social Computing (CPSCom), pp. 404-411, Dec. 18-20, 2010.*

Toyoda, H.; Okuno, M.; Nishimura, S.; Terada, M.; , "A 100 Gb/s and High-Reliable Physical-Layer Architecture for VSR and Backplane Ethernet," Communications, 2008. ICC '08. IEEE International Conference on , pp. 5417-5421, May 19-23, 2008.*

Xiaotao Chang; Mingming Zhang; Ge Zhang; Zhimin Zhang; Jim Wang; , "Adaptive Clock Gating Technique for Low Power IP Core in SoC Design," Circuits and Systems, 2007. ISCAS 2007. IEEE International Symposium on , pp. 2120-2123, May 27-30, 2007.*

Patel, P.; Hughes, J.; Herman, B.; Cases, M.; de Araujo, D.N.; Pham, N.; , "IBM BladeCenter system electrical packaging design challenges," Electrical Performance of Electronic Packaging, 2004. IEEE 13th Topical Meeting on , pp. 11-14, Oct. 25-27, 2004.*

* cited by examiner

US 8,356,190 B2

METHOD AND SYSTEM FOR ENERGY EFFICIENT COMMUNICATION AMONG ONE OR MORE INTERFACES IN A COMMUNICATION PATH

CROSS-REFERENCE TO RELATED APPLICATIONS/INCORPORATION BY REFERENCE

This application makes reference to, claims priority to, and claims the benefit of U.S. Provisional Application Ser. No. 61/111,653, filed on Nov. 5, 2008.

This application makes reference to:
U.S. patent application Ser. No. 12/471,861 filed on May 26, 2009;
U.S. patent application Ser. No. 12/470,785 filed on May 22, 2009;
U.S. patent application Ser. No. 12/470,970 filed on May 22, 2009;
U.S. patent application Ser. No. 12/474,557 filed on May 29, 2009;
U.S. patent application Ser. No. 11/685,554 filed Mar. 13, 2007; and
U.S. patent application Ser. No. 11/473,205 filed Jun. 22, 2006.

Each of the above stated applications is hereby incorporated herein by reference in its entirety.

FIELD OF THE INVENTION

Certain embodiments of the invention relate to networking. More specifically, certain embodiments of the invention relate to a method and system for energy efficient communication among one or more interfaces in a communication path.

BACKGROUND OF THE INVENTION

Communications networks and in particular Ethernet networks, are becoming an increasingly popular means of exchanging data of various types and sizes for a variety of applications. In this regard, Ethernet networks are increasingly being utilized to carry voice, data, and multimedia traffic. Accordingly more and more devices are being equipped to interface to Ethernet networks. Broadband connectivity including internet, cable, phone and VOIP offered by service providers has led to increased traffic and more recently, migration to Ethernet networking. Much of the demand for Ethernet connectivity is driven by a shift to electronic lifestyles involving desktop computers, laptop computers, and various handheld devices such as smart phones and PDA's. Applications such as search engines, reservation systems and video on demand that may be offered at all hours of a day and seven days a week, have become increasingly popular.

These recent developments have led to increased demand on datacenters, aggregation, high performance computing (HPC) and core networking. As the number of devices connected to data networks increases and higher data rates are required, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for energy efficient communication among one or more interfaces in a communication path, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for energy efficient communication among one or more interfaces in a communication path. In this regard, one or more of a plurality of network devices may be communicatively coupled via one or more serial and/or parallel interfaces. One or more circuits within the network devices may be operable to determine a power level mode of operation for the one or more interfaces and/or devices according to an energy efficient network communication control policy. The one or more circuits may configure the interfaces for the determined power level mode. In this regard, configuration in various interfaces may occur at one time instant or configuration may be cascaded sequentially through a plurality of interfaces. The plurality of network devices may comprise a physical layer device (PHY), a media access controller (MAC) and/or one or more higher OSI layer devices. The one or more of the interfaces may comprise a XGMII extender, for example, a XAUI and/or a XFI device. Moreover, the one or more interfaces may comprise a back plane PHY, for example, a 10 GBASE-KR, a 10 GBASE-KX4 and/or a 1 GBASE-KX PHY. The backplane PHY may be operable to perform forward error control (FEC). The one or more interfaces may comprise a direct attached copper PHY, for example, SFP+ and/or may comprise InfiniBand and/or 10 GBASE-CX4. Furthermore, the one or more serial interfaces may comprise a pluggable transceiver module comprising a direct attached copper PHY. Energy efficient network control data may be communicated to and/or from one or more of the plurality of network devices. The one or more plurality of network devices may enter or exit a lower power mode of operation based on the communicated energy efficient network control data. In some instances, the one or more plurality of network devices may buffer packets pending transmission by the interfaces while the interfaces and/or other components transition to the determined power level mode of operation.

Figure 1:
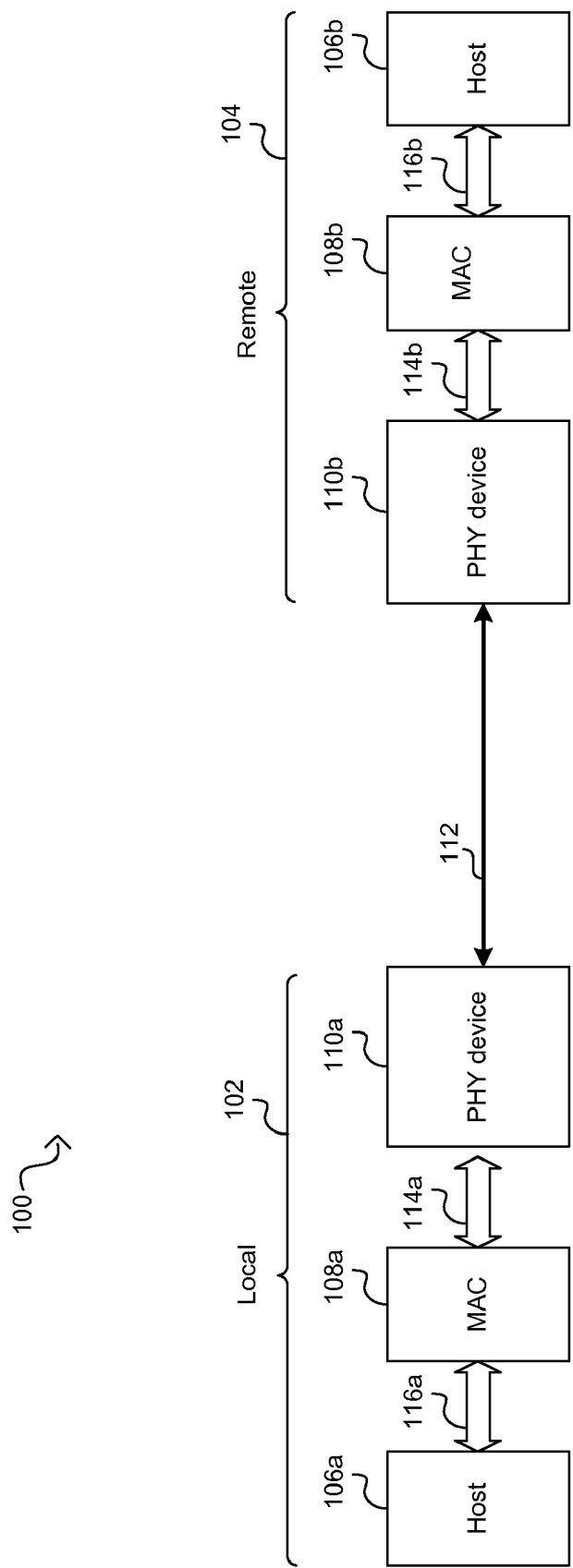
FIG. 1 is a block diagram illustrating an exemplary Ethernet connection between two network devices, in accordance with an embodiment of the invention.

FIG. 1 is a block diagram illustrating an exemplary Ethernet connection between a two network devices, in accordance with an embodiment of the invention. Referring to FIG. 1, there is shown a system 100 that comprises a network device 102 and a network device 104. In addition, there is shown two hosts 106a and 106b, two MAC controllers 108a and 108b, two PHY devices 110a and 110b, two interface controllers 114a and 114b, two bus controller interfaces 116a and 116b and a link 112

The network devices 102 and 104 may communicate via the link 112. The Ethernet link 112 is not limited to any specific medium and may utilize any suitable medium. Exemplary Ethernet link 112 media may comprise copper, optical and/or backplane technologies. For example, a copper medium such as STP, Cat3, Cat 5, Cat 5e, Cat 6, Cat 7 and/or Cat 7a as well as ISO nomenclature variants may be utilized. Additionally, copper media technologies such as SFP+, CX4, InfiniBand, ribbon and backplane may be utilized. With regard to optical media for the Ethernet link 112, single mode fiber as well as multi-mode fiber may be utilized.

In an exemplary embodiment of the invention, the link 112 may comprise up to four or more physical channels, each of which may, for example, comprise an unshielded twisted pair (UTP). The network device 102 and the network device 104 may communicate via two or more physical channels comprising the link 112. For example, Ethernet over twisted pair standards 10 BASE-T and 100 BASE-TX may utilize two pairs of UTP while Ethernet over twisted pair standards 1000 BASE-T and 10 GBASE-T may utilize four pairs of UTP. In this regard, however, aspects of the invention may enable varying the number of physical channels via which data is communicated.

In an exemplary embodiment of the invention, the network devices 102 and/or 104 may comprise a twisted pair PHY capable of operating at one or more standard rates such as 10 Mbps, 100 Mbps, 1 Gbps, and 10 Gbps (10 BASE-T, 100 GBASE-TX, 1 GBASE-T, and/or 10 GBASE-T); potentially standardized rates such as 40 Gbps and 100 Gbps; and/or non-standard rates such as 2.5 Gbps and 5 Gbps.

In another exemplary embodiment of the invention, the network devices 102 and/or 104 may comprise a backplane PHY capable of operating at one or more standard rates such as 10 Gbps (10 GBASE-KX4, 10 GBASE-KX and/or 10 GBASE-KR); and/or non-standard rates such as 2.5 Gbps and 5 Gbps.

In another exemplary embodiment of the invention, the network devices 102 and/or 104 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

In addition, the network devices 102 and/or 104 may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non standard speeds and non-standard technologies, for example, single channel, two channel or four channels may also be supported. More over, TDM technologies such as PON at various speeds may be supported by the network devices 102 and/or 104.

The network device 102 may comprise a host 106a, a medium access control (MAC) controller 108a, and a PHY device 104a. The network device 104 may comprise a host 106b, a MAC controller 108b, and a PHY device 110b. Notwithstanding, the invention is not limited in this regard. In various embodiments of the invention, the network device 102 and/or 104 may comprise, for example, computer systems or audio/video (A/V) enabled equipment. In this regard, A/V equipment may, for example, comprise a microphone, an instrument, a sound board, a sound card, a video camera, a media player, a graphics card, or other audio and/or video device. Additionally, the network devices 102 and 104 may be enabled to utilize Audio/Video Bridging and/or Audio/video bridging extensions (collectively referred to herein as audio video bridging or AVB) for the exchange of multimedia content and associated control and/or auxiliary data.

The PHY devices 110a and 110b may each comprise suitable logic, circuitry, and/or code that may enable communication, for example, transmission and reception of data, between the network device 102 and the network device 104. The PHY device 110a and/or the PHY device 110b may support, for example, Ethernet over copper, Ethernet over fiber, and/or backplane Ethernet operations. In an exemplary embodiment of the invention, one or both of the PHY devices 110a and 110b may comprise pluggable modules. Exemplary form factors for the pluggable modules may comprise SFP, SFP+, XENPAK, X2, XFP and XPAK modules. For example, the PHY devices 110a and/or 110b may support SFP+ direct attach copper. The PHY devices 110a and 110b may enable multi-rate communications, such as 10 Mbps, 100 Mbps, 1000 Mbps (or 1 Gbps), 2.5 Gbps, 4 Gbps, 10 Gbps, or 40 Gbps, for example. In this regard, the PHY devices 110a and 110b may support standard-based data rate limits and/or non-standard data rate limits. Moreover, the PHY devices 110a and 110b may support standard Ethernet link lengths or ranges of operation and/or extended ranges of operation. The PHY devices 110a and 110b may enable communication between the network device 102 and the network device 104 by utilizing a link discovery signaling (LDS) operation that enables detection of active operations in the other network device. In this regard the LDS operation may be configured to support a standard Ethernet operation and/or an extended range Ethernet operation. The PHY devices 110a and 110b may also be operable to support autonegotiation, which may for example, be utilized to identify and/or select communication parameters such as speed and duplex mode.

In various embodiments of the invention, the PHY devices 110*a* and 110*b* may comprise suitable logic, circuitry, and/or code that may enable transmission and/or reception at a high(er) data in one direction and transmission and/or reception at a low(er) data rate in the other direction. For example, the network device 102 may comprise a multimedia server and the network device 104 may comprise a multimedia client. In this regard, the network device 102 may transmit multimedia data, for example, to the network device 104 at high(er) data rates while the network device 104 may transmit control or auxiliary data associated with the multimedia content at low(er) data rates.

The data transmitted and/or received by the PHY devices 110*a* and 110*b* may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example.

In an exemplary embodiment of the invention illustrated in FIG. 1, the hosts 106*a* and 106*b* may implement OSI layer 3 and above, the MAC controllers 108*a* and 108*b* may implement OSI layer 2 and above and the PHY devices 110*a* and 110*b* may implement the operability and/or functionality of OSI layer 1 or the physical layer. In this regard, the PHY devices 110*a* and 110*b* may be referred to as physical layer transmitters and/or receivers, physical layer transceivers, PHY transceivers, PHYceivers, or PHY, for example. The hosts 106*a* and 106*b* may comprise suitable logic, circuitry, and/or code that may enable operability and/or functionality of the five highest functional layers for data packets that are to be transmitted over the link 112. Since each layer in the OSI model provides a service to the immediately higher interfacing layer, the MAC controllers 108*a* and 108*b* may provide the necessary services to the hosts 106*a* and 106*b* to ensure that packets are suitably formatted and communicated to the PHY devices 110*a* and 110*b*. During transmission, each layer may add its own header to the data passed on from the interfacing layer above it. However, during reception, a compatible device having a similar OSI stack may strip off the headers as the message passes from the lower layers up to the higher layers.

The PHY devices 110*a* and 110*b* may be configured to handle physical layer requirements, which comprise, but are not limited to, packetization, data transfer and serialization/deserialization (SERDES), in instances where such an operation is required. Data packets received by the PHY devices 110*a* and 110*b* from MAC controllers 108*a* and 108*b*, respectively, may include data and header information for each of the above six functional layers. The PHY devices 110*a* and 110*b* may be configured to encode data packets that are to be transmitted over the link 112 and/or to decode data packets received from the link 112.

The MAC controller 108*a* may comprise suitable logic, circuitry, and/or code that may enable handling of data link layer, layer 2, operability and/or functionality in the network device 102. Similarly, the MAC controller 108*b* may comprise suitable logic, circuitry, and/or code that may enable handling of layer 2 operability and/or functionality in the network device 104. The MAC controllers 108*a* and 108*b* may be configured to implement Ethernet protocols, such as those based on the IEEE 802.3 standard, for example. Notwithstanding, the invention is not limited in this regard.

The MAC controller 108*a* may communicate with the PHY device 110*a* via an interface 114*a* and with the host 106*a* via a bus controller interface 116*a*. The MAC controller 108*b* may communicate with the PHY device 110*b* via an interface 114*b* and with the host 106*b* via a bus controller interface 116*b*. The interfaces 114*a* and 114*b* correspond to Ethernet interfaces that comprise protocol and/or link management control signals. The interfaces 114*a* and 114*b* may be multi-rate capable interfaces and/or media independent interfaces (MII). The interfaces 114 and/or 114*b* may comprise parallel and/or serial links between the MAC controller and PHY device. For example, the interfaces 114*a* and/or 114*b* may comprise an MII, XGMII, SGMII, XAUI or XFI interface. The bus controller interfaces 116*a* and 116*b* may correspond to PCI or PCI-X interfaces. Notwithstanding, the invention is not limited in this regard.

In operation, exemplary PHY devices 110*a* and 110*b* may comprise direct attached copper interfaces that may comprise four duplex copper wires. The PHY devices 110*a* and 110*b* may transmit data via a fixed number of physical channels having a fixed data rate limit which may result in network links being underutilized and transmitting IDLE symbols for significant portions of time. In this regard, when the network devices 102 and 104 initiate a connection, they may exchange some preliminary information and/or training signals. In this regard, the network devices 102 and 104 may negotiate a data rate limit and duplex mode (e.g., full-duplex) for communicating with each other. Additionally, in order to establish reliable communications, each of the network devices 102 and 104 may need to "train" or adjust various parameters and/or circuitry in a network device to account for variables such as the type of cabling over which data is being communicated and the environmental conditions (e.g. temperature) surrounding the cabling.

Once the network devices are "trained", they may initially transmit the data via the direct attached copper in low voltage differential signaling via the four copper wires in the link 112. Transfer rates of 2.5 Gbps, 5 Gbps and/or 10 Gbps may be utilized depending on clocking methods, for example. In this regard, conventional PHY devices may distribute traffic evenly over all available physical channels and may continuously transmit IDLE symbols between packets of actual data. However, based, for example, on link utilization, past or present traffic statistics, and/or available resources (e.g., power, buffer space, processor time, etc.), it may be determined that 2.5 Gbps, 5 Gbps and/or 10 Gbps may be higher than necessary or desired.

In other embodiments of the invention, PHY 110*a* and 110*b* may comprise a backplane physical layer that may comprise suitable logic, circuitry, interfaces and/or code that are operable to improve energy efficiency. In this regard, the backplane PHYs 110*a* and 110*b* may be adapted to transition from a high(er) power mode of operation to a low(er) power mode of operation and/or vice versa.

Controlling the data rate limit of the connection between the network devices 102 and 104 may enable the network devices 102 and 104 to communicate in a more energy efficient manner. Moreover, while the data rate limit on the link 112 may be low(er), higher layer functions and/or resources, such as portions of the MAC controller may be placed into a low(er) power mode. The data rate limit may be controlled by, for example, controlling a number of physical channels utilized to communicate data, controlling the signal constellation utilized for representing data on the link, controlling a rate at which symbols are transmitted, and controlling the length of time between frames (the inter-frame gap). In this manner, aspects of the invention may enable network designers and/or administrators to control, with fine precision via a plurality of data rate variables, a data rate limit. At any given time instant, the data rate limit may determine the maximum data rate which the link may support at that instant. In instances that the actual data rate on the link is less than the data rate limit, the difference between the data rate limit and the actual data rate may correspond to wasted energy on the link and/or in network devices communicatively coupled to the link. Accordingly, the increased resolution with which the data rate limit may be controlled, via the plurality of variables, may enable reducing the difference between the data rate limit and the actual data rate; thus improving energy efficiency of the link and/or network devices communicatively coupled to the link.

Figure 2:
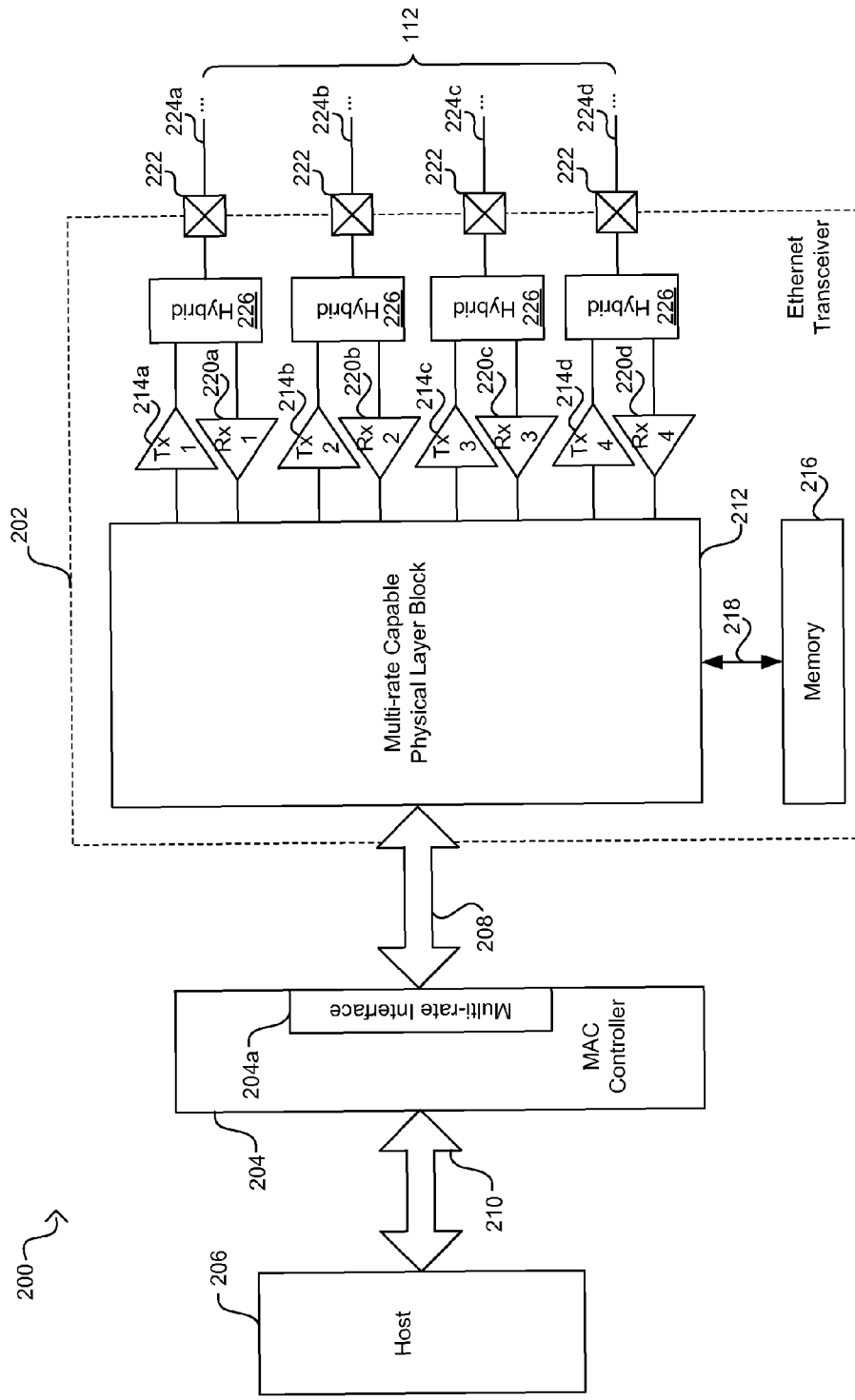
FIG. 2 is a block diagram illustrating an exemplary Ethernet over twisted pair PHY device architecture comprising a multi-rate capable physical block, in accordance with an embodiment of the invention.

FIG. 2 is a block diagram illustrating an exemplary Ethernet over twisted pair PHY device architecture comprising a multi-rate capable physical block, in accordance with an embodiment of the invention. Referring to FIG. 2, there is shown a network device 200 which may comprises an Ethernet over twisted pair PHY device 202, a MAC controller 204, a host 206, an interface 208, and a bus controller interface 210. The PHY device 202 may be an integrated device which may comprise a multi-rate capable physical layer block 212, one or more transmitters 214, one or more receivers 220, a memory 216, a memory interface 218, and one or more input/output interfaces 222.

The PHY device 202 may be an integrated device that comprises a multi-rate capable physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise a multi-rate capable interface 204a that may comprise suitable logic, circuitry, and/or code to enable communication with the PHY device 202 at a plurality of data rates via the interface 208.

The multi-rate capable physical layer block 212 in the PHY device 202 may comprise suitable logic, circuitry, and/or code that may enable operability and/or functionality of physical layer requirements. In this regard, the multi-rate capable physical layer block 212 may enable generating the appropriate link discovery signaling utilized for establishing communication with a remote PHY device in a remote network device. The multi-rate capable physical layer block 212 may communicate with the MAC controller 204 via the interface 208. In one aspect of the invention, the interface 208 may be a media independent interface (MII) or an XGMII and may be configured to utilize a plurality of serial data lanes for receiving data from the multi-rate capable physical layer block 212 and/or for transmitting data to the multi-rate capable physical layer block 212. However, the invention is not so limited and may utilize any suitable interface. For example, the interface 208 may comprise a XAUI implemented via traces between chips on a circuit board and/or a XFI interface for an optical transceiver. In this regard, the number of lanes between the MAC controller 204 and the PHY device 202 may be reduced and the distance between them may be extended.

The multi-rate capable physical layer block 212 may be configured to operate in one or more of a plurality of communication modes, where each communication mode may implement, for example, a different communication protocol. These communication modes may include, but are not limited to, Ethernet over twisted pair standards 10 BASE-T, 100 BASE-TX, 1000 BASE-T, 10 GBASE-T, and other similar protocols that utilize multiple physical channels between network devices. The multi-rate capable physical layer block 212 may be configured to operate in a particular mode of operation upon initialization or during operation. For example, auto-negotiation may utilize the FLP bursts to establish a rate (e.g. 10 Mbps, 100 Mbps, 1000 Mbps, or 10 Gbps) and mode (half-duplex or full-duplex) for transmitting information. Although FIG. 2 is described with respect to a twisted pair PHY device 202, the invention is not limited in this regard. For example, the PHY device 202 may comprise a direct attached copper interface such as CX4 and the physical channels 224a, 224b, 224c and 224d may comprise Infini-Band copper cables. In addition, the PHY device 202 may comprise a pluggable module for example, SFP+, XENPAK and/or X2.

The multi-rate capable physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the multi-rate capable physical layer block 212. The parameters may comprise configuration data and the code may comprise operational code such as software and/or firmware, but the information need not be limited in this regard. Moreover, the parameters may include adaptive filter and/or block coefficients for use, for example, by the multi-rate capable physical layer block 212 and/or the hybrids 226.

Each of the transmitters 214a, 214b, 214c, 214d may comprise suitable logic, circuitry, interface and/or code that may enable transmission of data from the network device 200 to a remote network device via, for example, the link 112 in FIG. 1. The receivers 220a, 220b, 220c, 220d may comprise suitable logic, circuitry, interface(s) and/or code that may enable receiving data from a remote network device. Each of the transmitters 214a, 214b, 214c, 214d and receivers 220a, 220b, 220c and 220d in the PHY device 202 may correspond to a physical channel that may comprise the link 112. In this manner, a transmitter/receiver pair may interface with each of the physical channels 224a, 224b, 224c and 224d. In this regard, the transmitter/receiver pairs may be enabled to provide the appropriate communication rate and mode for each physical channel.

The input/output interfaces 222 may comprise suitable logic circuitry, and/or code that may enable the PHY device 202 to impress signal information onto a physical channel, for example a twisted pair of the link 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of medium of the physical channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

In operation, the PHY device 202 may be enabled to transmit and receive simultaneously over up to four or more physical links. Accordingly, the network device 200 may comprise a number of hybrids 226 corresponding to the number of physical links. Each hybrid 226 may comprise suitable logic, circuitry, interface and/or code that may enable separating transmitted and received signals from a physical link. For example, the hybrids may comprise echo cancellers, far-end crosstalk (FEXT) cancellers, and/or near-end crosstalk (NEXT) cancellers. Each hybrid 226 in the network device 300 may be communicatively coupled to an input/output interface 222.

In operation, the network device 200 may communicate with a remote partner via the link 112. For example, for 10 Gbps Ethernet, the network device 200 may transmit data to and receive data from a remote partner via the physical channels 224a, 224b, 224c, and 224d. When there is no data for the network device 200 to transmit, then it may transmit IDLE symbols to keep itself and/or the remote partner "trained". In this manner, power consumption of a network may be largely independent of the amount of actual data being transmitted over the network. Accordingly, controlling the data rate limit on the link 112 may enable the network devices 200 to transmit fewer IDLE symbols and thus communicate in a more energy efficient manner.

The network device 200 may disable, or put into a low(er) power state, one or more of the physical channels 224, when those one or more physical channels are not required to meet current and/or future demand of the link. In this manner, transmitters 214, receivers 220, hybrids 226, and/or portions of the multi-rate capable PHY block 212 associated with the unused physical channels may be disabled. A channel in a low(er) power state a may operate in one or more ways. For example, one or more channels may convey little or no data, may be silent, may convey IDLE symbols and/or convey other energy. In some instances, all channels of a link may be placed into a low(er) power state. Furthermore, the PHY device 202 as well as the MAC controller 204 may be put to sleep.

The PHY device 202 and/or one or more components implementing the layers above the PHY layer may be placed in a low power idle mode (LPI) wherein the PHY device 202 and/or higher layer components may be powered down during idle periods. During power down, the PHY device 202 may maintain various coefficients, for example, adaptive filter and/or block coefficients and may maintain synchronization to allow for a more rapid return to an active state. In addition, during LPI mode, a portion of the receiver circuitry may be turned off. In asymmetric systems, devices that handle one direction of communication may be in a quiet state independent of devices that handle communication in an opposite direction. In synchronous systems, both directions of a PHY device may enter and/or leave a quiet state together. Although a PHY device may operate in a synchronous mode, OSI layers above the PHY may operate in an asymmetric mode.

In various embodiments of the invention, a low(er) power state may be enabled wherein channels of a link may remain active and a data rate limit on each of the channels may be controlled by adjusting a signal constellation, PAM levels, an IFG, and/or a symbol rate.

Figure 3:
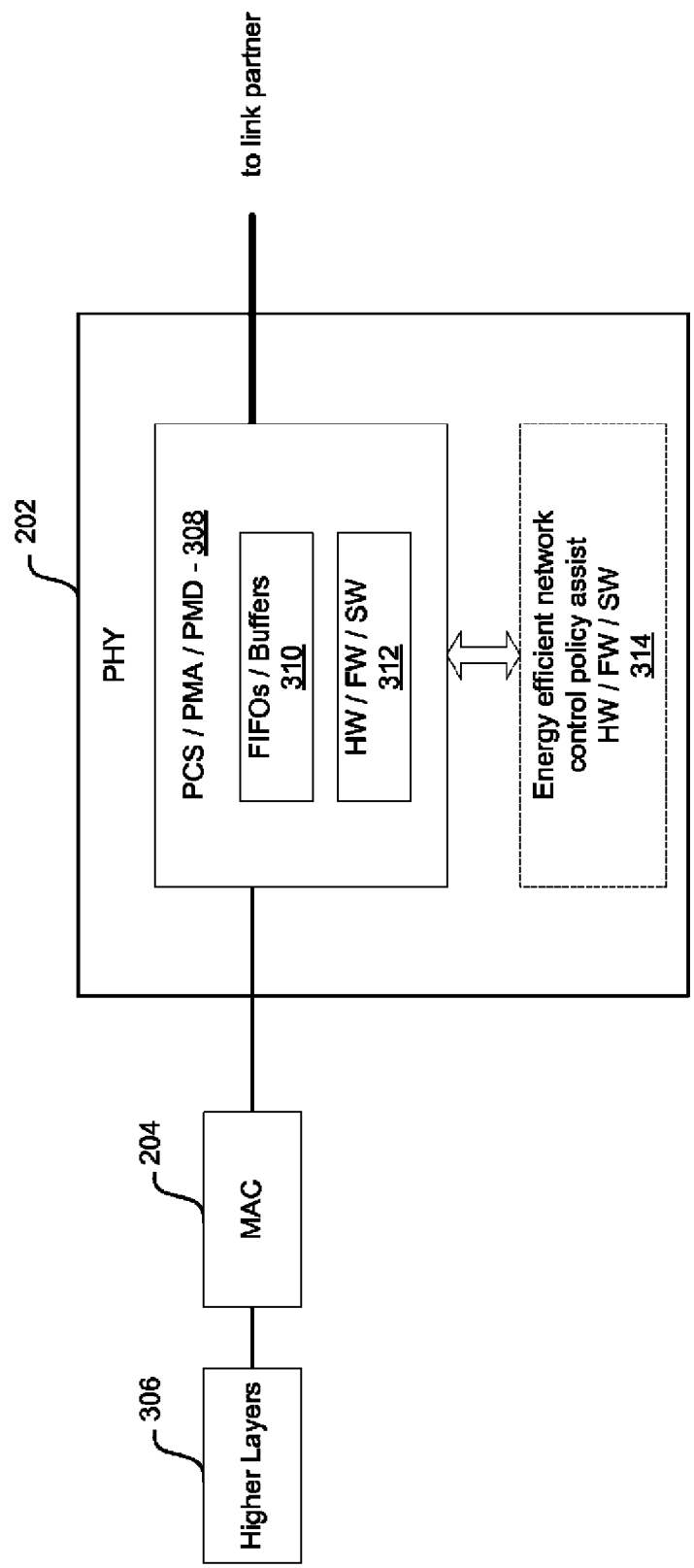
FIG. 3 is a block diagram illustrating an exemplary PHY device that is enabled to implement energy efficient networking, in accordance with an embodiment of the invention.

FIG. 3 is a block diagram illustrating an exemplary PHY device that is enabled to implement energy efficient networking, in accordance with an embodiment of the invention. Referring to FIG. 3, there is shown a block for layers above the MAC layer 306, the MAC 204 and the PHY device 202. The PHY device 202 may comprise a physical coding sublayer (PCS), physical media attachment (PMA) and/or physical media dependent (PMD) module 308 and an optional control policy assist module 314. The PCS, PMA and PMD module 308 may comprise a FIFO and/or buffer module 310 and a hardware, firmware and/or software module 312.

The MAC 204 and the PHY 202 are described with respect to FIG. 1 and FIG. 2. The layers above the MAC layer 306 are OSI layers that may comprise the host 206 layer and/or the interfaces 208 and 210 described with respect to FIG. 1 and FIG. 2, for example.

The PHY device 202 may comprise suitable logic, circuitry, interfaces and/or code that may be operable to improve energy efficiency for one or more PHY interfaces. In this regard, the PHY 202 may be operable to implement an energy efficient network (EEN) control policy that may comprise lowering power levels during periods of little or no data traffic. For example, a PHY may be operable to enter a low power idle mode (LPI) and/or may lower its data rate to reduce power consumption. Management of the EEN control policy implementation and/or decisions regarding when to enter and/or exit a low(er) power mode may originate from various parts of the system. Management of the control policy implementation may comprise approximating and/or monitoring transmit and/or receive traffic and/or determining when to enter and/or exit low(er) power modes. In addition, the EEN control policy may take into consideration latency constraints for various types of traffic for determining wake and/or sleep periods. Latency may be introduced while a PHY and/or a MAC controller transition from a period of low(er) power or a sleep period to a period of operation at a higher power. For example, in instances when latency is not tolerable, a series of traffic bursts may be buffered for an acceptable amount of time before waking the PHY device 202 and/or MAC controller 204 for delivery of the accumulated traffic bursts.

In various embodiments of the invention, the PHY device 202 may be operable to receive control policy management signals indicating when to go into a reduced power mode and/or when to exit the reduced power mode. The signals may be received from one or more layers above the PHY layer, for example. The signals may be embedded in an EEN control packet, for example, a "magic" packet, or may be communicated during an inter-packet gap and/or within a packet preamble for example. In addition, the signals may be received from a link partner. In other embodiments of the invention, the PHY device 202 may comprise the control policy and/or may control and/or originate the EEN control policy operations.

The PHY device 202 may comprise the PCS, PMA and/or PMD module 308 which may comprise suitable logic, circuitry, interfaces and/or code that may be operable to perform one or more of physical encoding and/or decoding, PMA framing and transmitter and/or receiver operations. In addition, the PHY device 202 may comprise the hardware, firmware and/or software module 312 that may be operable to implement a control policy within the PHY device 202. For example, the hardware, firmware and/or software module 312 may be operable to monitor and/or parse control signals and/or or packets received by the PHY device 202 that may comprise information about entering and/or exiting a low(er) power mode and/or about buffering packets.

In various embodiments of the invention, the PHY device 202 may comprise the FIFO and/or buffers 310 that may comprise suitable logic, circuitry, interfaces and/or code that may be operable to store packets and/or frames prior to transmission. For example, in instances when the PHY device 202 is waking-up from a low(er) power mode, packets may be received from higher layers while the PHY device 202 may need time to transition to an operational state. The PHY device 202 may store packets in the FIFO and/or buffer 310 until the PHY 202 is able to transmit them across the link. Similarly, a PHY within a link partner may also need to wake up and thus data may be buffered long enough for the PHYs in both link partners to exit LPI mode. In various embodiments of the invention, the MAC controller 204 may buffer packets.

The optional control policy assist module 314 may comprise suitable logic, circuitry, interfaces and/or code that may be operable assist in implementation of the EEN control policy within the PHY device 202. For example, the optional control policy assist module 314 may determine when to buffer packets and when to transmit and/or to receive. For example, the optional control policy assist module 314 may comprise timing and/or other parameters for the length of a sleep or wake cycle. In addition, the control policy assist module may send and/or receive EEN control information to and/or from a link partner. For example, the optional control policy assist module 314 may determine that a request for entering an LPI mode or a notification of entering an LPI mode should be sent to a link partner. In addition, the optional control policy assist module 314 may receive a request or notification from a link partner for entering into or exiting an LPI mode.

In operation, implementation and/or management of the EEN control policy may occur in various parts of the system 100. For example, the control policy may be managed by the layers above the MAC layer 306 and may be communicated to the PHY 202. In this regard, the layers above the MAC layer 306 may comprise suitable logic, circuitry, interfaces and/or code to monitor hardware, firmware, software and/or one or more buses to determine when a low(er) power mode of operation may be sufficient to handle traffic flowing through the system 100. Signals that may assert a low(er) power mode for the PHY device 202 may be communicated from the layers above the MAC layer 306.

Management of the EEN protocols and/or techniques may be based, for example, on management signals of an MDIO interface to the MAC. For example, the MDIO interface may configure thresholds such as how long the PHY device 202 should stay in a low(er) power mode after entering the low(er) power mode, how long a buffer should be empty before going into a low(er) power mode, and how full a buffer should be before waking up from a low(er) power mode. The MDIO interface may also be utilized to configure parameters pertaining to a link partner. Exemplary parameters comprise how long the link partner takes to wake up and how much buffering is available in the link partner's buffers. The MDIO interface may enable configuration of the control policy by a system designer or administrator.

In various exemplary embodiments of the invention, EEN control signals may by-pass the MAC controller 204 or the PHY device 202 may control implementation of the EEN control policy rather than the higher layers. In this manner, an EEN control policy may be implemented without a costly modification to the MAC controller 204. In this regard, the PHY device 202 may be integrated or may be a pluggable transceiver module such as a SFP, SFP+, XenPak or X2, for example.

Figure 4:
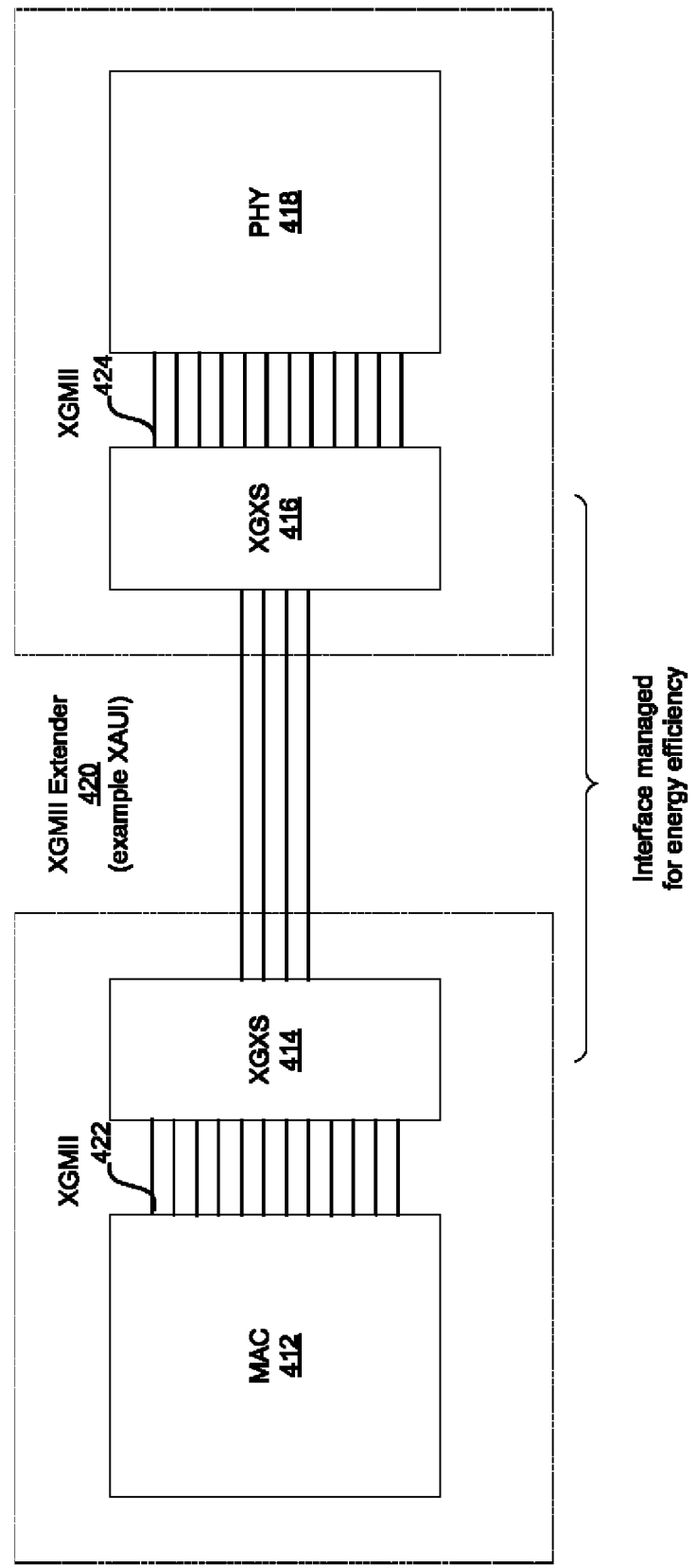
FIG. 4 is a block diagram illustrating an exemplary XGMII extender that is capable of energy efficient modes of operation, in accordance with an embodiment of the invention.

FIG. 4 is a block diagram illustrating an exemplary XGMII extender that is capable of energy efficient modes of operation, in accordance with an embodiment of the invention. Referring to FIG. 4, there is shown, a MAC 412, an XGXS 414, an XGXS 416, a PHY 418, an XGMII extender 420 and XGMII interfaces 422 and 424.

The PHY 418 may be similar or substantially the same as the PHY device 202 described, for example, with respect to FIG. 1, FIG. 2 and FIG. 3. The MAC 412 may be similar or substantially the same as the MAC controller 204 described with respect to, for example, FIG. 1, FIG. 2 and FIG. 3.

The XGMII interfaces 422 and/or 424 may be similar or substantially the same as the interfaces 114 and 203 described with respect to FIG. 1, FIG. 2 and FIG. 3, for example. The XGMII interfaces 422 and/or 424 may comprise suitable logic, circuitry and/or code that may be operable to communicate via parallel pins and/or traces between the MAC 404 and XGXS 414 and/or between the XGXS 416 and the PHY 418. In one embodiment of the invention, the XGMII may comprise a 10 Gbps media independent interface.

The XGXS modules 414 and/or 416 may each comprise suitable logic circuitry, interfaces and/or code that may be operable to communicate via a reduced number of lanes and/or over greater distances. In various embodiments of the invention, the XGXS modules 414 and/or 416 may be operable to convert parallel data received via the XGMII interfaces 422 and/or 424 respectively into a serial, self clocked data stream. The XGMII extender 420 may support chip to chip communication via traces on a circuit board. The XGMII extender 420 may comprise suitable logic circuitry and/or code to extend the distance between the MAC 412 and the PHY 418 relative to a distance that an XGMII interface may be capable of achieving. In various embodiments of the invention, the XGMII extender 420 may comprise a XAUI interface that may be operable to map the XGMII parallel data to four transmit and receive lanes wherein each lane may be operable to transmit at 3.125 Gbps based on 8B10B encoding. In other embodiments of the invention, the XGMII extender 420 may comprise a XFI interface that may be operable to map the XGMII parallel data to single lane that may be operable to run at 10.3125 Gbps based on 64B66B encoding for example.

In operation, one or more of the interfaces between the MAC 412 and the PHY 418 comprising the XGXS 414, the XGXS 416, the XGMII extender 420 and/or the XGMII interfaces 422 and 424 may comprise suitable logic, circuitry, interfaces and/or code that may be operable to operate in a low(er) power mode according to a energy efficient network control policy. In this regard, the control policy may be managed and/or implemented in an OSI layer above the MAC layer implemented in the MAC 412 and/or may be implemented in the PHY 418 layer. In this regard, the one or more interfaces between the MAC 412 and the PHY 418 may be operable to receive control policy management signals indicating when to go into a reduced power mode and/or when to exit the reduced power mode.

Figure 5A:
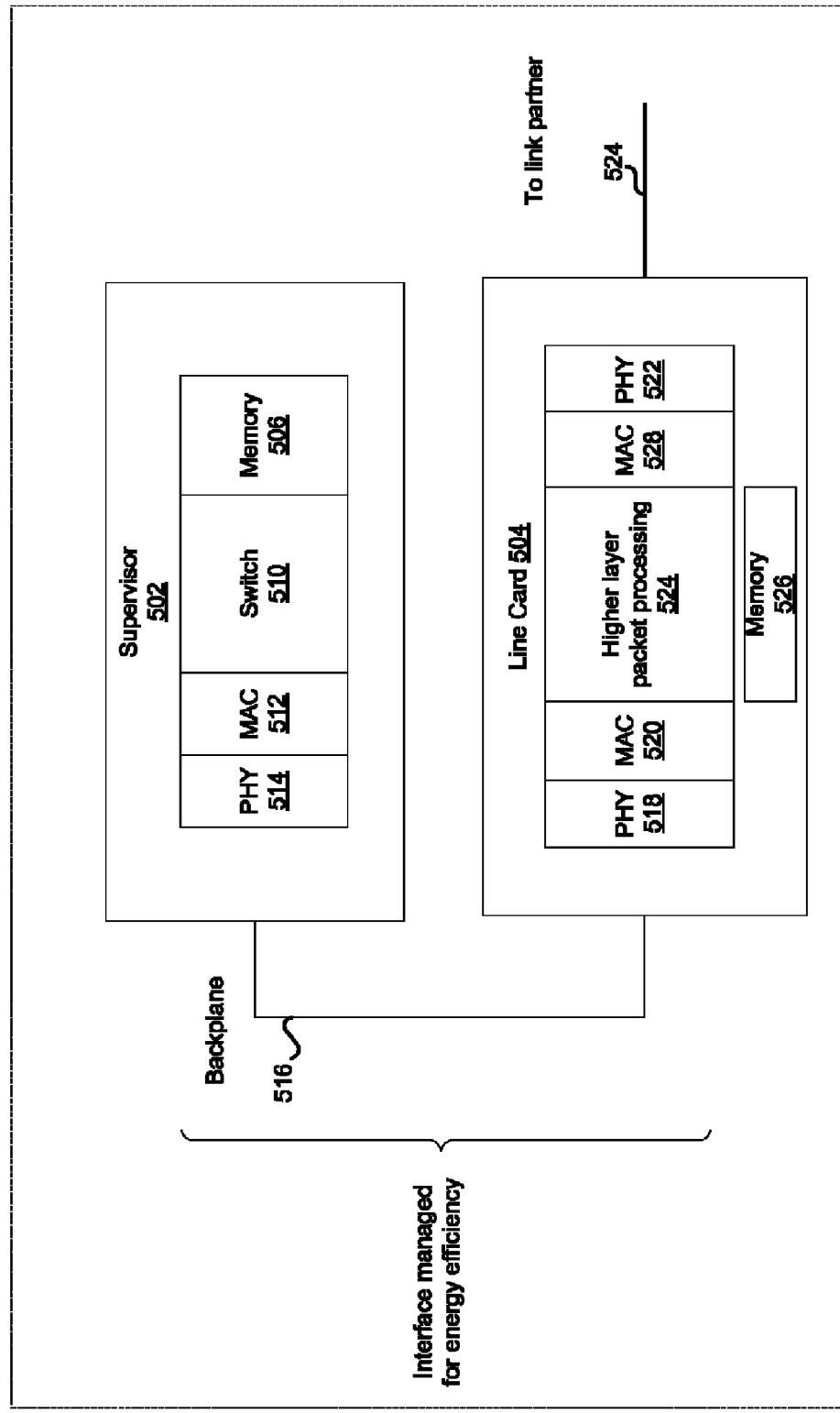
FIG. 5A is a block diagram illustrating an exemplary backplane PHY that is capable of energy efficient modes of operation, in accordance with an embodiment of the invention.

FIG. 5A is a block diagram illustrating an exemplary backplane PHY that is capable of energy efficient modes of operation, in accordance with an embodiment of the invention. Referring to FIG. 5A, there is shown, a supervisor 502 that may comprise a memory 506, switch chip 510, a MAC 512 and a back plane PHY 514. In addition, there is shown a line card 504 that may comprise a backplane PHY 518, a MAC 520, packet processing 524, a memory 526, a MAC 528 and a PHY 522. There is also shown a backplane 516 and a link 524.

The link 524 may be similar to or substantially the same as the link 112 described with respect to FIG. 1, for example. The MAC 512 and the MAC 520 may be similar and/or substantially the same as the MAC 108 and/or the MAC 208 described with respect to FIG. 1, FIG. 2 and FIG. 3, for example. The PHY 522, the backplane PHY 514 and/or the backplane PHY 518 may be similar and/or substantially the same as the PHY device 110 and/or 202 described with respect to FIG. 1, FIG. 2 and FIG. 3, for example.

The backplane 516 may comprise suitable logic, circuitry, interfaces and/or code that may be operable to handle communication among a plurality of circuit boards that may be connected to the backplane. In this regard, the backplane 516 may be operable to support communication between the backplane PHY 514 and the backplane PHY 518 based on 10 GBASE-KR, 10 GBASE-KX4 and/or 1 GBASE-KX Ethernet standards, for example. The 10 GBASE-KR and/or 10 GBASE-KX4 versions of backplane Ethernet may be implemented with or without forward error control (FEC). Exemplary applications for the backplane 516 may comprise switches, routers and blade servers.

The supervisor 502 may comprise suitable logic, circuitry, interfaces and/or code that may be operable to manage communication among one or more line cards such as the line card 504 that may be connected to the backplane 516. The supervisor 502 may comprise the switch chip 510. The switch chip 510 may comprise suitable logic, circuitry, interfaces and/or code that may be operable to interconnect network nodes via the one or more line cards communicatively coupled to the backplane 516, such as the line card 504. The switch chip 510 may provide Open Systems Interconnect (OSI) layer 2 and above operability. The switch chip 510 may comprise the MAC 512.

The MAC 512 may comprise suitable logic, circuitry, interfaces and/or code that may enable handling of data link layer, layer 2, operability and/or functionality in the switch chip 510. The MAC 512 may be operable to communicate with the backplane PHY 514 via any suitable interface, for example a GMII, an XGMII and/or an extended XGMI for example.

The backplane PHY 514 and the backplane PHY 518 in the line card 504 may comprise suitable logic, circuitry, interfaces and/or code that may be operable to communicate via the backplane 516 in accordance with one or more standard rates such as 10 Gbps, 1 Gbps and/or at non-standard rates such as 2.5 Gbps and 5 Gbps. For example, the backplane PHY 514 and/or the backplane PHY 518 may be operable to communicate based on 10 GBASE-KX4, 1 GBASE-KX and/ or 10 GBASE-KR Ethernet standards.

The line card 504 may comprise suitable logic, circuitry, interfaces and/or code that may be operable to provide an interface between the external link 524 and the backplane 516. The line card 504 may be a swappable module that may be upgradable. The line card 504 may comprise the backplane PHY 518 that may communicate via the backplane 516 with the backplane PHY 514 in the supervisor 502. In addition, the line card 504 may comprise the PHY 522 that may communicate with other network nodes via the external link 524. The MAC 520 and the MAC 528 may be operable to implement OSI layer 2 and above operability in the line card 504 and may communicate with the backplane PHY 518 and the PHY 522. The packet processing module may handle OSI layer 3 and/or higher layer processing. The memory 526 may be operable to buffer packet data.

The backplane PHY 514 and/or the backplane PHY 516 may comprise suitable logic, circuitry, interfaces and/or code to implement energy efficient network (EEN) control policies. In this regard, the backplane PHYs 514 and/or 516 may be adapted to operate in a low(er) power mode. For example, low power idle and/or sub-rating, for example, and may be operable to transition from a low power idle mode to a high (er) power mode of operation and/or vice versa.

In operation, the backplane PHYs 514 and/or 518 and one or more other portions of the supervisor 502 and/or the line card 504 may be operable to transition from between a low (er) power mode and a higher power mode and vice versa based on an EEN control policy. Traffic communicated across the backplane 516 may be monitored and/or future traffic may known or estimated. It may be determined according to the control policy that the backplane PHYs 514 and/or 518 may be placed in a low(er) power mode or in a high(er) power mode based on pending, current, and/or future traffic. In this manner energy consumption may be reduced in the backplane PHYs 514 and/or 518.

The control policy may be managed in the supervisor 502 and/or in the line card 504. For example, one or more of the backplane PHYs 514 and 518 may control the power level modes of operation and may send EEN control signals to one or other component in the supervisor 502 and/or the line card 504 according to the control policy. In other embodiments of the invention, the control policy may be managed by layers above the PHY layer, for example, in the packet processor 524. In this regard, EEN control policy signals that assert or enable a particular mode of operation may be communicated to one or more of the backplane PHYs 514 and 518 to in order to implement low(er) and/or high(er) power modes. The EEN control signals may be embedded in an EEN control packet, a "magic" packet, or may be communicated during an inter-packet gap and/or within a packet preamble for example. Packet data that may be pending transmission may be buffered while one or more of the backplane PHYs 514 and 518 and/or other components of the supervisor 502 and/or the line card 504 are transition between different modes of operation.

Figure 5B:
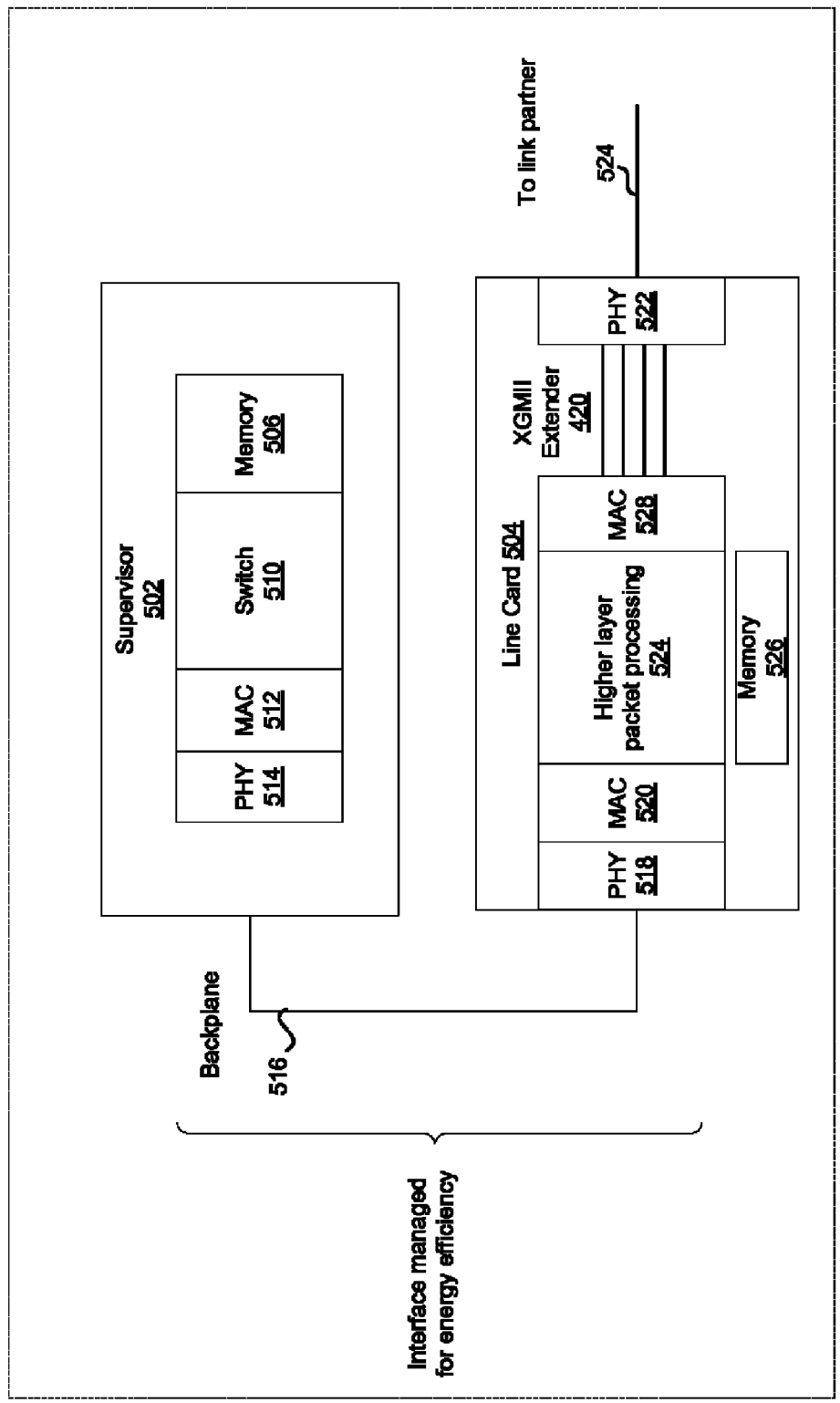
FIG. 5B is a block diagram illustrating an exemplary implementation of cascading energy efficient mode over a plurality of interfaces in a communication path, in accordance with an embodiment of the invention.

FIG. 5B is a block diagram illustrating an exemplary implementation of cascading energy efficient mode over a plurality of interfaces in a communication path, in accordance with an embodiment of the invention. Referring to FIG. 5B there is shown the supervisor 502 that may comprise the memory 506, the switch chip 510, the MAC 512 and the back plane PHY 514. In addition, there is shown the line card 504 that may comprise the backplane PHY 518, the MAC 520, the packet processor 524, the memory 526, the MAC 528 and the PHY 522. There is also shown the backplane 516, the link 524 and the XGMII extender 420.

The supervisor 502, the memory 506, the switch chip 510, the MAC 512, the back plane PHY 514 the line card 504, the backplane PHY 518, the MAC 520, the packet processor 524, the memory 526, the MAC 528 and the PHY 522, the backplane 516 and the link 524 are described with respect to FIG. 5A. The XGMII extender 420 is described with respect to FIG. 4A.

The XGMII extender 420 may provide an interface between the MAC 528 and the PHY 522. In this regard, the XGMII extender 420 may be a serial or parallel interface and may be part of an IEEE standard or may be a proprietary interface, for example. For example, the XGMII extender 420 may be a XAUI or a XFI interface. In various embodiments of the invention, the MAC 528 and the PHY 522 may be implemented on different pieces of silicon. Moreover, interfaces between other layer devices may be implemented on different pieces of silicon. For example, an interface between the switch chip 510 and the MAC 512 and/or an interface between the PHY 514 and the MAC 512 may be implemented over a plurality of silicon chips.

In operation, communication may be established with a link partner via the PHY device 222 and the link 524. Packets may be communicated and/or processed via a communication path comprising one or more devices and/or interfaces within the line card 504, the backplane 516 and the supervisor 502. For example packets may be communicated and/or processed along a communication path comprising the PHY 522, the XGMII extender 420, the MAC 528, the packet processor 524, the MAC 520, the backplane PHY 518, the back plane PHY 516, backplane PHY 514, the MAC 512, the switch 510 and the memory 506. In instances when there is little or no packet data for communication, a power level mode of operation, for example, a low(er) power level mode of operation, may be determined for one or more devices and/or interfaces within the communication path.

In various embodiments of the invention, the determined power level mode may be configured within the one or more devices and/or interfaces along the communication path at one time instant and/or at different time instants. For example, configuration of devices and/or interfaces for lower power mode may be cascaded in succession along the communication path as devices and/or interfaces finish processing and/or communicating packets. In an exemplary embodiment of the invention, the PHY 522, the XGMII extender 422 and the MAC 528 may be transitioned to a low(er) power mode of operation and the backplane PHY 518, the backplane 516 and the backplane PHY 514 may subsequently be placed in a lower power mode of operation. Although a linecard and switch architecture are shown in FIG. 5A and FIG. 5B, the invention is not so limited and may comprise other network devices. For example, an exemplary embodiment of the invention may comprise one or more devices of a computer, a router, an aggregation switch, a blade server and a data center switch.

Figure 6:
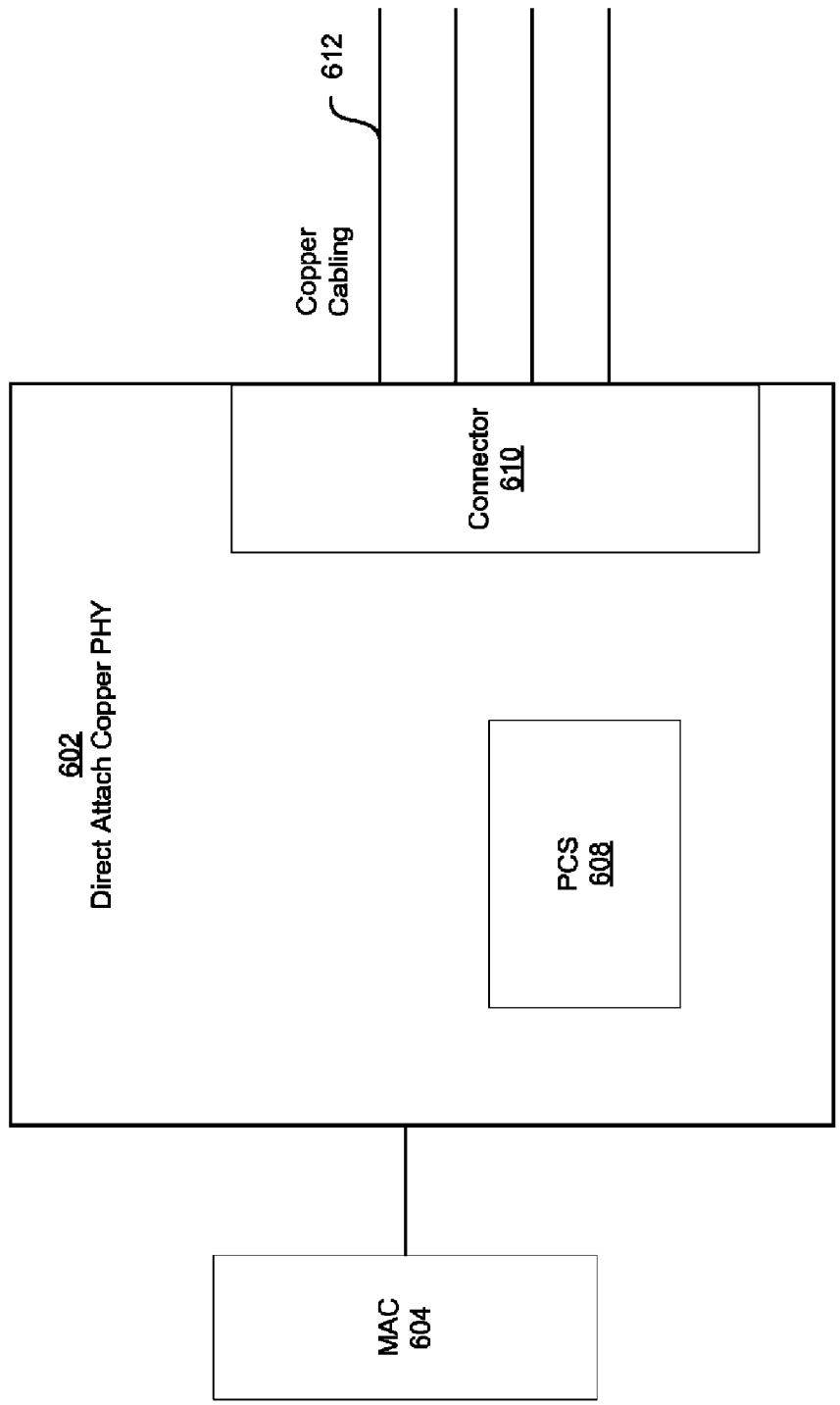
FIG. 6 is a block diagram illustrating an exemplary direct attached copper interface that is capable of energy efficient modes of operation, in accordance with an embodiment of the invention.

FIG. 6 is a block diagram illustrating an exemplary direct attached copper interface that is capable of energy efficient modes of operation, in accordance with an embodiment of the invention. Referring to FIG. 6, there is shown a MAC 604, a PHY 602, a physical coding sub-layer (PCS) 608, a connector 610 and copper link 612.

The MAC 604 may be similar and/or substantially the same as the MAC 108 and/or the MAC 208 described with respect to FIG. 1, FIG. 2 and FIG. 3, for example. The PHY 602 may be similar and/or substantially the same as the PHY devices 110, 202, 418 and/or 522 described with respect to FIG. 1, FIG. 2, FIG. 3, FIG. 4 and/or FIG. 5 for example.

The PHY 602 may comprise suitable logic, circuitry, interfaces and/or code that may be operable to transmit and/or receive data via a direct attach copper interface and/or a copper medium, for example, the copper link 612. The MAC 604 may send data to the PHY 602 that may be formatted according to a suitable protocol, for example, InfiniBand or QLogic protocol. The PHY 602 may transmit and/or receive serial data via the connector 610. The connector 610 may be an InfiniBand connector. In this regard, the serial data may be transmitted via the connector 610 in low voltage differential signaling via four duplex copper wires in the copper link 612. In various embodiments of the invention, data may be transmitted by the PHY 602 at transfer rates of 2.5 Gbps, 5 Gbps, 10 Gbps, for example.

In various embodiments of the invention the PHY 602 may be operable to transmit and/or receive data via the copper link 612 based on 10 GBASE-CX4 specifications. In this regard, the connector 610 may comprise a Multi-source Agreement (MSA) module to provide the connectivity to the copper link 612. The PCS 608 may manage and/or synchronize data flowing among four lanes within the copper link 612 according to 802.3ae Clause 48 protocol.

In operation, the PHY 602 may be operable to transition between a low(er) power level and a higher power level according to an EEN control policy. The PHY 602 may administer the control policy and/or may communicate control signals to layers above the PHY layer and/or to link partners. In various embodiments of the invention, the PHY 602 may receive control policy management signals indicating when to go into a reduced power mode and/or when to exit the reduced power mode. The signals may be received from one or more layers above the PHY layer, for example, the MAC layer 604 or layers above the MAC 306 described with respect to FIG. 3. In this regard, the control signals may be embedded in an EEN control packet, may comprise a "magic" packet, may be communicated during an inter-packet gap and/or may be communicated within a packet preamble, for example. In addition, the signals may be received from a link partner. The PHY 602 may be part of a communication path wherein a reduced power mode may be implemented in the PHY 602 as well as other interfaces along the communication path.

Figure 7:
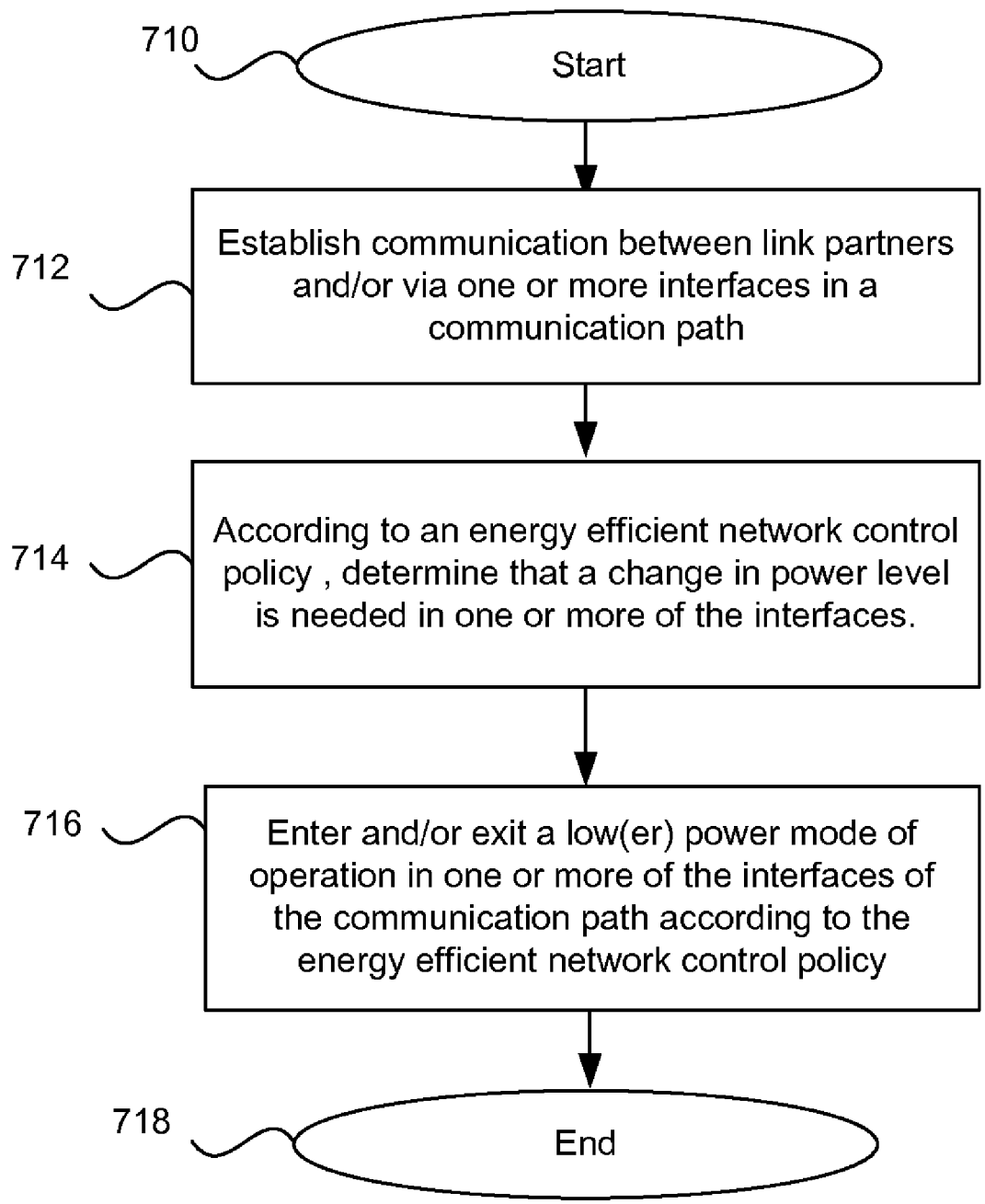
FIG. 7 is a flow chart illustrating exemplary steps for implementing an energy efficient network control policy in a plurality of interfaces of a communication path, in accordance with an embodiment of the invention.

FIG. 7 is a flow chart illustrating exemplary steps for implementing an energy efficient network control policy in a plurality of interfaces of a communication path, in accordance with an embodiment of the invention. The exemplary steps may begin with start step 710. In step 712, communication may be established via one or more interfaces in a communication path that may comprise two link partners. For example, the interfaces may operate between the two link partners such as via the PHY to PHY direct attach copper interface 602 and/or between two PHYs via a backplane such as between the PHY device 514 and/or the PHY device 518. Moreover, the interfaces may operate between a MAC and a PHY, for example, the interfaces may comprise a XAUI or XFI interface. In step 714, a control policy that may be administered by one or both link partners may be utilized to determine that a change in power level is appropriate. For example, a low level of traffic may be detected by one or both of the link partners that may indicate an opportunity to reduce energy consumption. In step 716, one or more of the interfaces within the communication path, for example, one or more MAC to PHY interfaces and/or PHY to PHY interfaces may enter and/or exit a low(er) power mode of operation according to the EEN control policy. Step 718 may be an end of exemplary steps.

In an embodiment of the invention, one or more of a plurality of network devices for example, the MAC 412 and the PHY 418, the PHY 514 and the PHY 518, the MAC 528 and the PHY 522 and/or the PHY 602 and a link partner may be communicatively coupled via one or more interfaces. In this regard, one or more of a plurality of network devices may be communicatively coupled via one or more serial and/or parallel interfaces. One or more circuits within the network devices may determine a power level mode of operation for the one or more interfaces according to an energy efficient network communication control policy. The one or more circuits may configure the interfaces for the determined power level mode. In this regard, configuration in various interfaces may occur at one time instant or configuration may be cascaded sequentially through a plurality of interfaces.

The plurality of network devices may comprise a physical layer device (PHY), a media access controller (MAC) and/or higher layer devices. The one or more interfaces may comprise a XGMII extender 420, for example, a XAUI and/or a XFI device. Moreover, the one or more interfaces may comprise a back plane PHY 514 and/or 518, for example, a 10 GBASE-KR, a 10 GBASE-KX4 and/or a 1 GBASE-KX backplane PHY. The backplane PHY 514 and/or 518 may perform forward error control (FEC). The one or more interfaces may comprise a direct attach copper PHY, for example, SFP+ and/or may comprise InfiniBand and/or 10 GBASE-CX4. Furthermore, the one or more interfaces may comprise a pluggable transceiver module that may comprise a direct attached copper PHY, for example. Energy efficient network control data may be communicated to and/or from one or more of the plurality of network devices. The one or more plurality of network devices may enter or exit a lower power mode of operation based on the communicated energy efficient network control data. In some instances, one or more of the plurality of network devices may buffer packets pending transmission by the interfaces while the interfaces, for example, the connector 610 and/or other components transition to the determined power level mode of operation.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for energy efficient communication among one or more interfaces in a communication.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A network device, comprising:
    a backplane;
    a first module that includes a first physical layer device and a second physical layer device, said first physical layer device being coupled to an external second network device via a network cable, said second physical layer device being coupled to said backplane, said first physical layer device having a first power mode and a second power mode, wherein during sail first power mode, said first physical layer device having a transmitter that transmits at a first data transmission rate and consumes a first level of power, and during said second power mode, said transmitter transmits at a second data transmission rate lower than said first data transmission rate and consumes a second level of power lower than said first level of power;
    a second module that includes a third physical layer device, said third physical layer device being coupled to said backplane, said backplane enabling communication between said third physical layer device and said second physical layer device; and
    an energy efficiency control policy module, said energy efficiency control policy module being configured to determine a need to transition said first physical layer device from said first power mode to said second power mode,
    wherein a plurality of interfaces in a communication path that extends in a direction upstream from an interface between said first physical layer device and said network cable are configured to transition to an energy saving mode in response to said determined need to transition said first physical layer device to said second power mode.

2. The network device of claim 1, wherein said energy efficiency control policy module is in said first physical layer device.

3. The network device of claim 1, wherein said plurality of interfaces includes an interface between said first physical layer device and a media access controller device.

4. The network device of claim 1, wherein said plurality of interfaces includes an XGMII extender interface.

5. The network device of claim 1, wherein said plurality of interfaces transitions substantially at the same time as said transition of said first physical layer device.

6. The network device of claim 1, wherein said plurality of interfaces transitions at a later time than said transition of said first physical layer device.

7. A method, comprising:
    determining, by an energy efficiency control policy in a network node, a need to transition a first physical layer device in a first module in said network node from a first power mode to a second power mode, wherein during said first power mode, a transmitter in said first physical layer device transmits at a first data transmission rate and consumes a first level of power, and during said second power mode, said transmitter transmits at a second data transmission rate lower than said first data transmission rate and consumes a second level of power lower than said first level of power, said first physical layer device being coupled to an external link partner via a network cable, said first module also including a second physical layer device that is coupled to a third physical layer device in a second module in said network node via a backplane;
    transitioning, by said network node, said first physical layer device from said first power mode to said second power mode; and
    communicating, by said network node, one or more energy efficiency control signals to one or more additional physical layer devices in a communication path that extends in a direction upstream from an interface between said first physical layer device and said network cable, wherein said one or more energy efficiency control signals enables said one or more additional physical layer devices in said communication path to transition to an energy saving mode.

8. The method of claim 7, wherein one of said additional physical layer devices is in a second network node.

9. The method of claim 7, wherein said determining comprises determining by an energy efficiency control policy in said first physical layer device.

10. The method of claim 7, wherein said transitioning said first physical layer device comprises transitioning to a low power idle mode.

11. The method of claim 7, wherein said transitioning said first physical layer device comprises transitioning to a subrating mode.

12. The method of claim 7, wherein said communicating comprises communicating within a packet preamble.

13. The method of claim 7, wherein said communicating comprises communicating within an inter-packet gap.

14. The method of claim 7, wherein said communicating enables transitioning an interface between one of said additional physical layer devices and a media access controller device.

15. The method of claim 7, wherein said communicating enables transitioning an XGMII extender interface.

16. The method of claim 7, wherein said communicating enables transitioning a backplane interface between two backplane physical layer devices.

17. The method of claim 7, wherein said communicating enables transitioning said one or more additional physical layer devices substantially at the same time as said first physical layer device.

18. The method of claim 7, wherein said communicating enables transitioning said one or more additional physical layer devices at a later time than said first physical layer device.

* * * * *

UNITED STATES PATENT AND TRADEMARK OFFICE
CERTIFICATE OF CORRECTION

PATENT NO. : 8,356,190 B2
APPLICATION NO. : 12/478320
DATED : January 15, 2013
INVENTOR(S) : Wael William Diab It is certified that error appears in the above-identified patent and that said Letters Patent is hereby corrected as shown below:

Col. 18, line 4, replace "sail" with --said--.

Signed and Sealed this
Twelfth Day of March, 2013

Teresa Stanek Rea
*Acting Director of the United States Patent and Trademark Office*